US008869106B2

(12) United States Patent
Jazdzewski et al.

(10) Patent No.: US 8,869,106 B2
(45) Date of Patent: Oct. 21, 2014

(54) LANGUAGE SERVICE PROVIDER MANAGEMENT USING APPLICATION CONTEXT

(75) Inventors: Charles P. Jazdzewski, Redmond, WA (US); Michael C. Fanning, Redmond, WA (US); Randy S. Kimmerly, Woodinville, WA (US); A. Michael Horton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 13/329,140

(22) Filed: Dec. 16, 2011

(65) Prior Publication Data
US 2013/0159968 A1   Jun. 20, 2013

(51) Int. Cl.
G06F 9/44      (2006.01)
G06F 9/45      (2006.01)

(52) U.S. Cl.
USPC ........... 717/114; 717/140; 717/141; 717/143; 717/144

(58) Field of Classification Search
None
See application file for complete search history.

(56) References Cited

U.S. PATENT DOCUMENTS

| | | | |
|---|---|---|---|
| 5,410,698 A | 4/1995 | Danneels et al. | |
| 7,574,705 B2 | 8/2009 | Taivalsaari et al. | |
| 8,533,669 B2* | 9/2013 | King et al. | 717/111 |
| 2005/0172265 A1* | 8/2005 | Brigham et al. | 717/120 |
| 2007/0011651 A1* | 1/2007 | Wagner | 717/110 |
| 2007/0044066 A1 | 2/2007 | Meijer et al. | |
| 2007/0180429 A1* | 8/2007 | Gogh et al. | 717/126 |
| 2007/0294665 A1* | 12/2007 | Papakipos et al. | 717/119 |
| 2007/0294680 A1* | 12/2007 | Papakipos et al. | 717/149 |
| 2008/0320444 A1* | 12/2008 | Meijer et al. | 717/110 |
| 2010/0269095 A1* | 10/2010 | King et al. | 717/111 |
| 2011/0113412 A1 | 5/2011 | Kobayashi et al. | |
| 2013/0159981 A1* | 6/2013 | Klemenz et al. | 717/143 |

OTHER PUBLICATIONS

Stubenschrott, "A context sensitive code completion system for the C and C++ programming languages," Apr. 2005.*
Drossopoulou, et al., "Flexible Models for Dynamic Linking", In Proceedings of the 12th European Symposium on Programming, vol. 2618 of LNCS, Apr. 2003, pp. 38-53.
Liang, et al., "Dynamic Class Loading in the JavaTM Virtual Machine", In Proceedings of the the 13th ACM SIGPLAN conference on Object-oriented programming, systems, languages, and applications, 1998, pp. 36-44.

(Continued)

Primary Examiner — Insun Kang
(74) Attorney, Agent, or Firm — Kevin Sullivan; Brian Haslam; Micky Minhas (57) ABSTRACT

A language service provider framework that generates an application context of a dynamic language program being authored. The application context includes a description of the dynamic language application being authored, one or more specific locations within the program, and runtime environment information. A language service provider port component holds one or more language service providers. Each language service provider may receive the application context and generate a set of available symbols corresponding to each of at least one of the identified one or more specific locations. A management component receives the application context from the application context generation component, provides the application context the language service provider, and correspondingly receives the available symbol set from the language service provider. Since the management component provides an application context that also includes runtime environment information, the available symbol set may be more accurately represented, thereby facilitating authoring of dynamic language programs.

20 Claims, 6 Drawing Sheets

(56) References Cited

OTHER PUBLICATIONS

Kapitza, et al. "DLS: a CORBA Service for Dynamic Loading of Code", In Proceedings of the OTM Confederated International Conferences, 2003, pp. 1333-1350.

Dahlem, et al., "Assimilating Service-finding into Object-Oriented Languages", Published on May 8, 2007, Available at: https://www.scss.tcd.ie/disciplines/software_systems/ssg/ssg_web/old/Report%20106%20Assimilating%20Service-finding%20into%20Object-Oriented%20Languages.pdf.

* cited by examiner

LANGUAGE SERVICE PROVIDER MANAGEMENT USING APPLICATION CONTEXT

BACKGROUND

When authoring code in any given software language, it is often helpful for the author to be presented with a list of options for valid references (called "available symbol sets") that could be inserted at a particular arbitrary point in the code. Such lists are referred to as "completion lists" as they often assist the author with a list of possible choices for completing a valid expression.

Software languages may be categorized as "dynamic languages" or "static languages". A fundamental characteristic of dynamic languages is that they lack a type system. Thus, the generation of complete and accurate completion lists at arbitrary points in code for dynamic languages is a difficult problem for several reasons. Most significantly, the lack of a type system makes it difficult or impossible to resolve the type of a variable at a specific point in code by means of techniques used by language services written for strongly-typed languages such as C#.

For strong-typed languages, code editors can construct a rich code model based on supporting metadata and/or static analysis of source. For dynamic languages, the most reliable information regarding a variable type is available at runtime. It is difficult, however, to reliably execute code outside of the actual application, web site, or other runtime context. For example, it is difficult to guarantee that execution will halt at a specific point of interest to allow for the analysis to occur at that point in the processing. Furthermore, it is difficult to contrive a set of valid inputs to a specific code segment (e.g., a routine). Past implementations have used such techniques as altering the dynamic language interpreter in order to solve some of these issues.

BRIEF SUMMARY

At least one embodiment described herein relates to a language service provider framework. The framework includes an application context generation component that generates an application context of a dynamic language program being authored. The application context includes one or more specific locations in the dynamic language program, a description of the dynamic language application being authored (e.g., during authoring time, or after authoring time when the authored code is evaluated for correctness) and also runtime environment information. A language service provider port component holds one or more language service providers. Each language service provider may receive the application context and generate a set of available symbols corresponding to each of at least one of the one or more specific locations in the dynamic language program. A management component receives the application context from the application context generation component, provides the application context to the language service provider, and correspondingly receives the set of available symbols from the language service provider. Since the management component provides an application context that also includes runtime environment information, the available symbol set may be more accurately represented.

In some embodiments, if there are multiple language service providers, the management component may also select one of the language service providers to attempt to provide the available symbol set. In some embodiments, the management component might also cause the dynamic language program to be rewritten and resubmitted to the selected language service provider if the selected language service provider does not timely provide the available symbol set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a language service provider framework includes an application context generation component that generates an application context of a dynamic language program being authored. For instance, an author may be originally authoring the program, or an evaluator may be evaluating correctness of the authored program. Either could be considered the process of authoring consistent with the principles described herein, although "authoring time" refers to a period of time in which the program is being originally authored.

The application context includes a description of the dynamic language program being authored, an identification of one or more specific locations in the program, and also runtime environment information. A language service provider port component holds one or more language service providers. Each language service provider may receive the application context and generate an available symbol set corresponding to each of at least one of the one or more specific locations in the dynamic language program. A management component receives the application context from the application context generation component, provides the application context to the language service provider, and correspondingly receives the available symbol set from the language service provider. Since the management component provides an application context that also includes runtime environment information, the available symbol set may be more accurately represented. In some embodiments, if there are multiple language service providers, the management component may also select one of the language service providers to attempt to provide the available symbol set.

Figure 1:
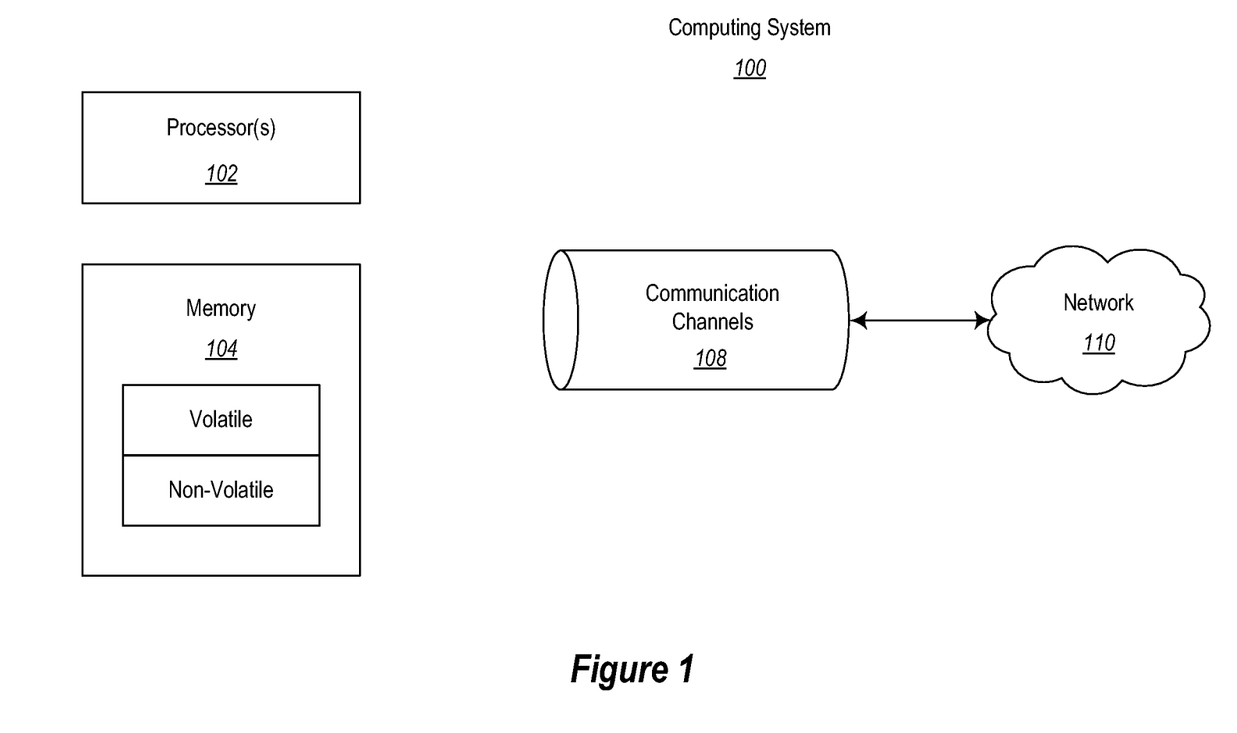
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
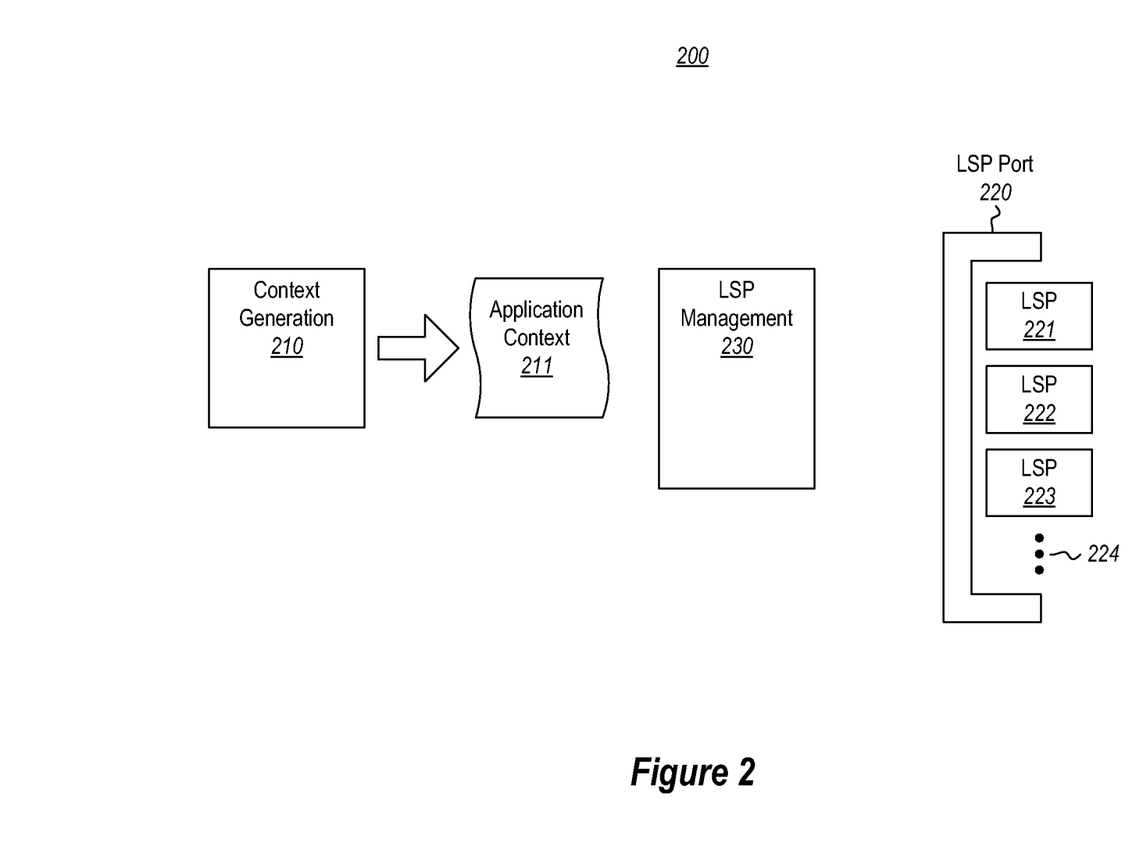
FIG. 2 illustrates a language service provider framework that includes an application context generation component that generates an application context of a dynamic language program being authored.
Figure 3:
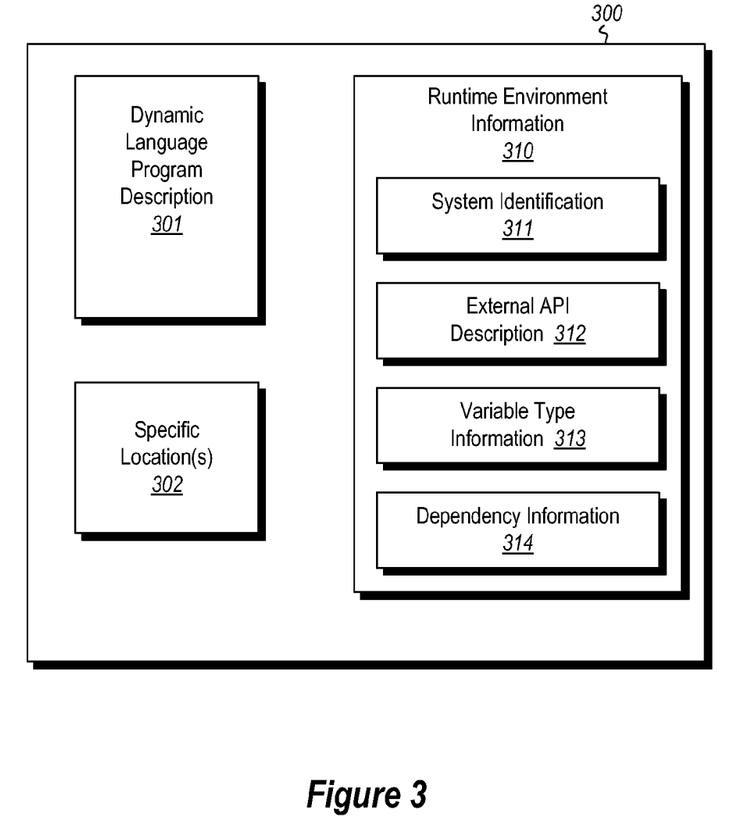
FIG. 3 abstractly illustrates an example of the application context with its various contents.

FIG. 2 illustrates a language service provider framework 200 that includes an application context generation component 210 that generates an application context 211 of a dynamic language program being authored. FIG. 3 abstractly illustrates an example of the application context 300 with its various contents. The application context 300 includes a description of the dynamic language program 301, an identifier for one or more specific locations 302 within the dynamic language program, and runtime environment information 310. In some embodiments, the elements of the application context 300 may be explicitly identified within the application context. In this way, different language service providers may interpret the schema of the application context, and provide their own processes for handling the elements of the application context.

The dynamic language program description 301 could include, for instance, the source code of the dynamic language program. The runtime environment information 310 may include system identification 311. This system identification 311 may include an operating system identifier or a browser identifier. However, the system identification might also include a set of versions of environmental software (e.g., operating system or browser) in which the dynamic language program might operate. In this case, the language service provider might provide for a common subset of available APIs (that are common to all of the versions in the set) when executing the dynamic language program. The doc type/doc mode may also be included as the application context generation component 210 may acquire this information from user configuration, or project type information corresponding to the dynamic language program. The doc mode qualifies the available API's. In this way, a new browser version can provide backwards compatibility for mark-up written against previous versions.

The runtime environment information 310 might also include a description of at least a portion of available external Application Program Interfaces (APIs) 312, and type information 313 for multiple variables in the dynamic language program.

The runtime environment 310 might also include dependency information 314 regarding whether and what execution resources the dynamic language program being authored depends on. As an example, perhaps the dynamic language program is not to be executed until another program executes.

In some embodiments, the dynamic language program description 301 may simply be the file being authored or evaluated. In some embodiments, the dynamic language program description file could be the sole source of information regarding dependency information 314 or other application context used to generate an available symbol set. This could include in-source comments that describe dependencies (such as utilization of an external framework library such as JQuery), dependencies that can be determined statically from actual code (such as dynamic insertion of a <script> element with a specific URL), and/or code that dynamically loads script which cannot be statically determined (described further below).

The dynamic language program description 301 may also include other application code. Conceptually, this is code that is part of the application under development in that this application code is not an external dependency. This other application code may be in the form of files, and generally do not use special handling to acquire. This is because they are persisted and/or managed locally or as part of a storage mechanism for which the user has permissions. They also do not imply special handling in terms of security in that the code is trusted for execution. In some embodiments, application code is denoted by 1) its existence in an application project file (for environments that track project items and other configuration details in this way), 2) its presence in a specific directory/other writable location (for environments which construct a project based on the contents of a directory), and/or 3) an in-source reference to a file via a relative URL (in this case, the file should exist in the proper relative relationship wherever project files are persisted).

An application might refer to an external JS file (such as the JQuery framework). These files can be referenced in the same manner as application code, by in-source reference (as external URL), in a project file (again as an external URL), or requested during execution itself. Two related issues in files of this kind are that they are not trusted and are not internal to the machine. For these cases, the framework 200 may provide a download mechanism and potentially rewrite the source under analysis to refer to the locally cached copy. Merely requesting an external resource on the web can provoke certain types of security issues, so there may be settings and/or a user-driven approval process for performing the fetch. This downloading may be driven by user configuration.

There are several advantages to having these files cached locally. For instance, performance may be improved, may be made more deterministic, and this may allow more flexibility as far as sandboxing execution. The framework 200 may identify unverified files that a user has downloaded from the internet and added to the project file, in contrast with an environment in which the downloaded code is simply trusted. On NTFS file systems, these files will be marked with a bit indicating they have been downloaded from the internet, in which case the framework 200 could follow the same user experience as for untrusted code (including removing the unsafe bit from the file if the user approves).

As for implied dependencies, there are several categories of callable API that are not expressed as code that is parsed/interpreted/executed by a runtime. These include 1) DOM API, 2) other external API, and 3) surrogate code. Each will now be explained.

As for DOM API, a significant portion of JavaScript executes in a browser environment, in which the browser/script host populates the execution environment with a large body of callable API (such as the window and document objects). This API varies by browser provider, by browser version, and by document doctype/docmode. For instance, an HTML document can be authored to explicitly force the document into a specific doc mode, which implies a specific available DOM API. In some embodiments, this implied callable DOM API is expressed as JavaScript that, when executed, populates the runtime with appropriate objects/methods.

As for other external APIs, any script host has the ability to extend callable API at runtime. Many execution environments also provide interoperability mechanisms (such as web services and COM activation) with implied API. These also can be provided in the system as executable JavaScript. Thus, system identification 311 may include external APIs that are not native to the dynamic language runtime.

As for surrogate code, in some cases, for perhaps reasons of performance, convenience, or security, source code that exists and is actually parsed/executed in real world execution might be replaced by surrogate JavaScript code that can be executed in context of the language.

Absent a well-maintained and properly ordered set of in-source annotations describing a JS file's dependencies, an HTML file that consumes some JavaScript can be very helpful for determining references as well as proper ordering of file load (since any HTML file organizes its script elements properly in order for code to execute correctly). The framework 200 permits JavaScript files to provide a reference to an HTML file that consumes it in order to identify what other JS code it might depend on and in what order they should load.

This can save significant developer maintenance costs. In cases where JS code refers to external files, the code may be downloaded locally and added to the application context in proper execution order. As mentioned previously, this download may be configured by the user on an ad hoc basis or by means of application settings or other configuration data (such as per-project settings). HTML also can contain embedded code (e.g., within <script> elements or as embedded script associated with event handlers) that should be extracted and passed to the language service (since a file under edit might itself depend on this code). Finally, some browsers populate the JS callable API with variables that represent HTML elements expressed in the mark-up. In Internet Explorer, for example, any div marked with an id can be referred to from JavaScript directly by that id (rather than acquiring it via getElementById). For this case, the HTML would be parsed looking for elements with an ID and then construct surrogate JS that populates the global namespace with the appropriate set of identifiers.

These categories are useful for driving user experience/configuration, potentially dictate handling in the general framework itself and could imply special handling in a language service provider. Users might configure a project for a web application as targeting only a specific version of a browser. As mentioned, the infrastructure might treat external code with more care than trusted application code. When calculating a closure of dependencies that might be in play for editing a specific file, the infrastructure might also make decisions based on these categorizations. The downloader might not aggressively parse external files, for example, for a complete closure of its possible dependencies but depend instead on the hooks in the engine to identify when that external code itself pulls in other files.

Referring to FIG. 2, the language service provider framework 200 includes a language service provider port component 220 configured to hold one or more language service providers. For instance, as illustrated, the language service provider port component 220 holds three language service providers 221, 222 and 223. However, the ellipses 224 represents that there is flexibility in how many language service providers are made available to the language service provider port component 220.

Figure 4:
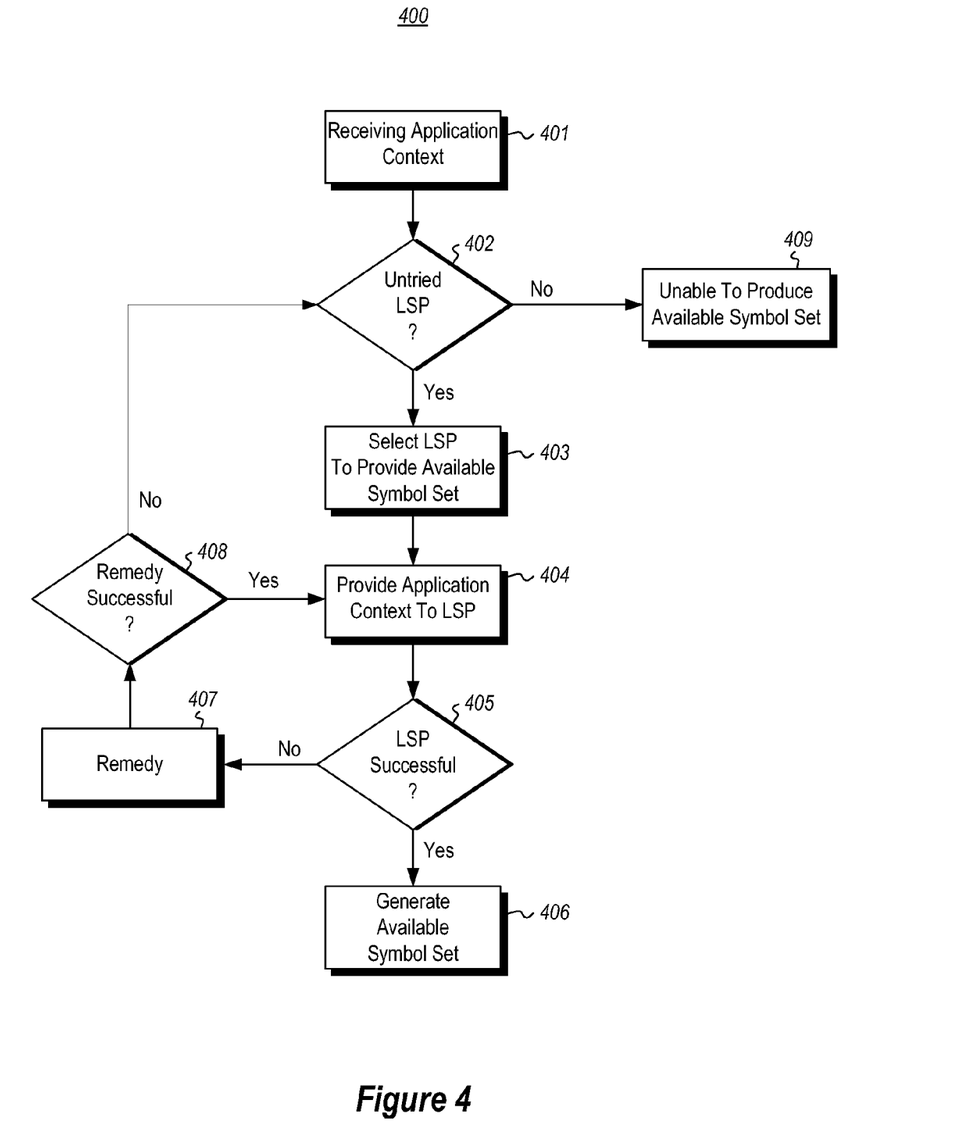
FIG. 4 illustrates a flowchart of a method for managing multiple language service providers.

The language service provider framework 200 also includes a management component 230 that is configured to manage use of the various language service providers available to the framework 200. FIG. 4 illustrates a flowchart of a method 400 for managing multiple language service providers. As the method 400 may be performed by the management component 230 of FIG. 2, the method 400 of FIG. 4 will now be described with frequent reference to the framework 200 of FIG. 2.

In accordance with the method 400, the management component receives an application context from an application context generation component (act 401). For instance, referring to FIG. 2, the management component 230 receives the application context 211 from the application context generation component 210.

If there are any language service providers that have not yet been tried ("Yes" in decision block 402), then the management component selects a language service provider (act 403) that is to provide the available symbol set. At this point, the method 400 has not yet tried any language service providers, and thus if there are multiple available language service providers, then the management component 230 selects one of those available language service providers. For instance, referring to FIG. 2, the management component 230 may choose from any of the language service providers 221, 222 or 223.

The selection of language service provider may be made based on, for example, a user preference. For instance, perhaps the user prefers to use language service provider 221. In that case, the selection may default to the language service provider 221, or at least the language service provider 221 would be weighted more heavily with other factors in the selection process that it would be without being the user default.

The selection may also be based on a default selection. For instance, perhaps language service provider 222 is selected by the management component 230 by default, absent a contrary indication by the user.

Alternatively or in addition, the selection might also be based on an evaluation of historical performance of each of the available language service providers. For instance, perhaps language service provider 221 tends to supply available symbol sets that are higher quality and in a faster time than the other language service providers 222 and 223. This excellent historical performance may be tracked by the management component 230, causing the management component 230 to select the language service provider 221 as a provider of first resort. Conversely, a language service provider that crashes might be permanently disabled or disabled for a specific file.

In some embodiments, the management component 230 might operate a language service provider in a condition in which the language service provider is prevented from performing certain actions. This is often termed "sandboxing". The management component 230 may further disable the language service provider if it attempts to perform a forbidden action. This reduces the risk posed by rogue language service providers, thereby lessening the risk of trying new language service providers. The management component 230 may also have a mechanism for removing the language service provider from the sandboxed condition once the language service provider satisfies one or more trust tests.

Once the language service provider is selected (act 403), the management component provides the application context to the selected application service provider (act 404). The selected language service provider then processes the application context with the aim to generate an available symbol set (e.g., perhaps so that the available symbol set may be used to build a completion list) corresponding to each of at least one of the one or more specific locations 302. If the language service provider is successful ("Yes" in decision block 405), then the available symbol set is generated (act 406).

For instance, in FIG. 2, suppose that the management component 230 selects language service provider 221. The language service provider 221 would then process the application context provided by the management component 230, and if successful in generating an available symbol set, would provide the available symbol set to the management component 230. The management component 230 could then visualize the available symbol set (perhaps through a completion list, although not required) to the author of the dynamic language program, to assist the author in further authoring the dynamic language program.

The management component 230 may optionally perform other qualification of the available symbol set based on the application context. For instance, suppose that the language service provider returns a particular available symbol set. The management component 230 may perform further qualification of the available symbol set before returning the symbol set to the user. For instance, the management component 230 may provide an annotation indicating that there may be a restriction on a particular symbol as to a particular version of a browser and/or operating system, or other environmental restrictions. In another example, suppose that a variable may be a String or a Number. In that case, perhaps the management component 230 might visually distinguish (e.g., by a using tabs) those available symbols that corresponding to a String type, and those that correspond to a Number type.

If the language service provider is not successful in generating a satisfactory available symbol set ("No" in decision block 405), then the management component 230 may attempt to remedy (act 407). For instance, the language service provider may be considered not successful if it does not generate the available symbol set in an acceptable amount of time. If the remedy is successful ("Yes" in decision block 408), the management component may provide the application context back to the selected language service provider (act 404) to reattempt the language service provider (decision block 405). For instance, the management component 230 may then cause the dynamic language program to be rewritten in an attempt to remedy the problem prior to having the language service provider reattempt execution.

On the other hand, if the remedy is not successful ("No" in decision block 408), then another language service provider may be tried if available (decision block 402). For instance, suppose in that language service provider 221 was first attempted unsuccessfully. At decision block 402, there are still two more language service providers 222 and 223 that have not yet been tried. Thus, there are still more untried language service providers ("Yes" in decision block 402). The management component 230 then again selects one of the language service providers (suppose language service provider 222), and provides the application context to the selected language service provider (act 404). If the language service provider 222 is successful ("Yes" in decision block 405), then the available symbol set is generated (act 406). Otherwise, if the language service provider is not successful ("No" in decision block 405), and the situation is not remedied ("No" in decision block 407), then the final language service provider may be tried.

At decision block 402, there is still one more language service provider 223 that has not yet been tried. Thus, there are still more untried language service providers ("Yes" in decision block 402). The management component 230 then again selects one of the language service providers. In this case, the selection would be trivial as there is only one more untried language service provider 223. Accordingly, the management component 230 provides the application context to the selected service provider (act 405). If the language service provider 223 is successful ("Yes" in decision block 405), then the available symbol set is generated (act 406). Otherwise, if the language service provider is not successful ("No" in decision block 405), and the situation is not remedied ("No" in decision block 407), the method 400 returns to decision block 402.

However, now there are no further untried language service providers ("No" in decision block 402) at this point. Accordingly, the management component 230 is unable to generate an available symbol set (act 409). However, at this point, the management component 230 had tried three language service providers and tried to remedy the lack of success in each case. Thus, it may be a truly rare circumstance that the method 400 is unable to generate the available symbol set.

The management component 230 may perform a number of additional tasks. For instance, the management component 230 may be configured to select a fall-back ordering of the language service providers in case of a failure of one or more of the language service providers to provide acceptable symbol sets. For instance, referring to FIG. 2, the management component 230 may determine that it should first attempt generation of the symbol set using the language service provider 221, and if not successful, then language service provider 223, and if not successful, then language service provider 222.

Alternatively or in addition, the management component 230 may register new language service providers as they are added to the language service provider port component 220. Alternatively or in addition, the management component 230 may additionally search for available language service providers that could be plugged into the language service provider port component. Alternatively or in addition, the management component 230 may capture environmental state upon completion of execution of dynamic language programs.

Figure 5:
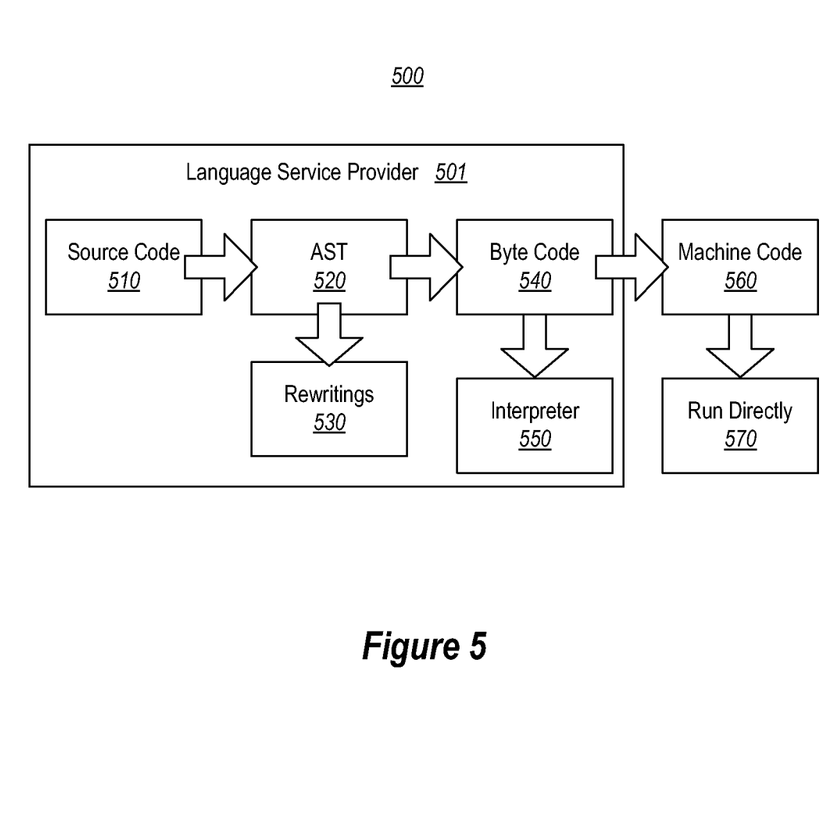
FIG. 5 illustrates an environment that includes a language service provider.

One or more of the language service providers 221 through 224 in the language service provider port 220 may be an advanced language service provider as will now be described. FIG. 5 illustrates an environment 500 that includes a language service provider 501 that may represent one of the language service providers 221 through 224, although not required. The environment 500 also shows a certain flow in which some actions and program representations are handled within the language service provider 501, and some actions are handled outside the language service provider 501.

The language service provider 501 begins its analysis with source code 510 of a dynamic language program being authored in its current authoring state (hereinafter referred to as the "current dynamic program"). The source code 510 may include the application context as well that gives a description of the actual runtime in which the dynamic language program is anticipated to be executed. FIG. 3 above shows an example of the application context.

In some embodiments, the dynamic language program represents just one code segment in a dynamic code sequence. In that case, the application context provides information describing the position of the dynamic language program in the sequence as described above. Furthermore, to improve efficiency of execution, the language service provider 501 may have captured an execution state of the dynamic code sequence prior to execution of the dynamic language program. In that way, when the dynamic language program is to be re-executed, rather than execute all code segments in the dynamic code sequence prior to executing the dynamic language program, the language service provide may set the execution state to be that prior captured state, and then immediately execute the dynamic language program. In addition to the dependency information of the dynamic code sequence, the captured execution state may be included within the application context.

The source code (along with its application context) is at least partially converted into an abstract syntax tree 520. An abstract syntax tree is a tree representation of the syntactic structure of the corresponding source code. Typically, each node in the abstract syntax tree represents a construct of the source code. For any given parent node (corresponding to a parent construct) that has children nodes (corresponding to children constructs), the children construct is a component construct within the parent construct, wherein the child construct and the parent construct have a particular relationship. Abstract syntax trees are known in the art, and thus will not be described in further detail herein. The definition of the term "abstract syntax tree" as used herein is not intended to differ from the ordinary and customary meaning of that term in the art.

However, unlike conventional abstract syntax trees, the abstract syntax tree 520 is subject to transformation by rewriting 530. The rewriting of the abstract syntax tree may occur before attempting to execute the current dynamic program in its current authoring state. Alternatively or in addition, the rewriting of the abstract syntax tree may occur after attempting to execute the current dynamic program. For instance, it might be faster and/or simpler to determine whether the abstract syntax tree should be rewritten based on the results of execution. For instance, if a halt point is designated at which execution should stop to generate a completion list, and if execution is taking a long time to reach that halt point, then that might indicate that rewriting of the abstract syntax tree is warranted.

The abstract syntax tree, whether transformed or not, may then be converted to byte code 540 and interpreted 550 by the language service provider 501. The language service provider 501 detects when execution reaches the halt point and constructs an available symbol set by analyzing program state at the halt point. The halting capability might be provided by a hook in the execution engine and/or using existing debugging services/capabilities provided alongside or as part of the execution engine.

Optionally, the byte code 540 may be converted to machine code 560, and such machine code 560 provided as output from the language service provider 501. The byte code 560 may then be directly executed 570 by the environment 500 outside of the language service provider 501 up to the halt point so that the available symbol set may be constructed by analyzing program state at the halt point.

Figure 6:
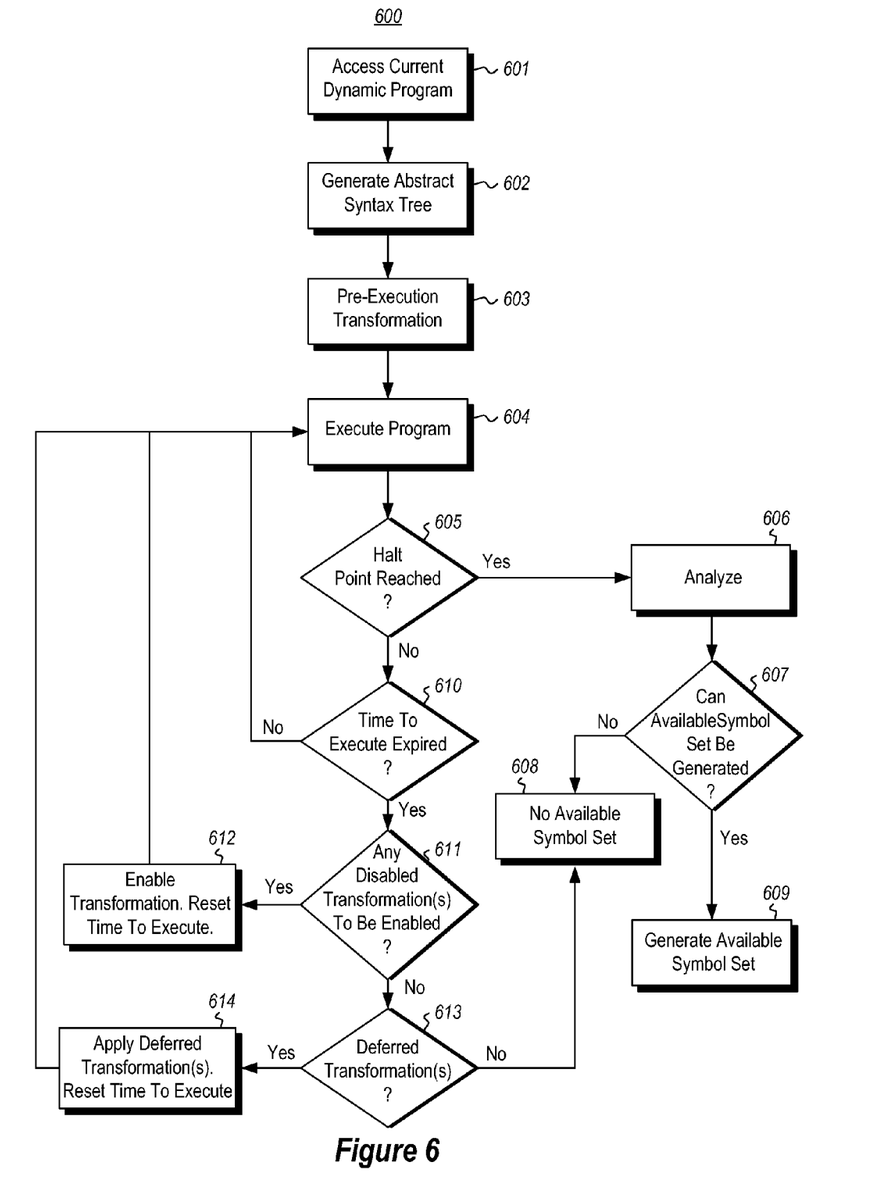
FIG. 6 illustrates a flowchart of a method for facilitating authoring of a dynamic language program by transforming an abstract syntax tree.

FIG. 6 illustrates a flowchart 600 of a method 600 for facilitating authoring of a dynamic language program by transforming an abstract syntax tree. As a dynamic language program is being authored, the dynamic language program may be executed a number of times at different stages of the authoring process. The method 600 of FIG. 6 may be performed at each of one or more of those different stages of the authoring process. Accordingly, when discussing the method 600, reference to the dynamic language program will often use the modifier "current" (e.g., "current dynamic program") to represent that the method 600 is being performed on the dynamic language program at a particular arbitrary point in the authoring process, and perhaps even after authoring is complete and the correctness of the authored code is being evaluated As the method 600 of FIG. 6 may be performed in the environment 600 of FIG. 2 (although not required), the method 600 of FIG. 6 will now be described with frequent reference to the environment 500 of FIG. 5.

The current dynamic program is first accessed (act 601). As just explained, the "current" dynamic program represents the dynamic language program as it exists at a particular arbitrary point in the authoring process. Referring to FIG. 5 as an example, the language service provider 501 accesses the source code 510. Although not required, the source code 510 may include source code as well as additional application context.

The abstract syntax tree is then generated that represents at least part of the source code (act 602). For instance, in FIG. 5, the language service provider 501 generates abstract syntax tree 520 based on the source code 510. At this point before execution, the language service provider may optionally modify the abstract syntax tree by considering the current dynamic program pre-execution (act 603). Potential reasons for such pre-execution modification of the abstract syntax tree will be described.

As a first example, a current dynamic program that is currently being authored or edited may not be entirely syntactically correct. For instance, the current dynamic program might not be parsed without some errors occurring. The language service provider may provide resilience in these cases, fixing up the code in a sensible way to permit execution to the identified specific point in the code for which the available symbol set is to be generated.

Furthermore, at this point, directed execution transformations may be made. The directed execution transformations are transformations that are made with the purpose of changing the course of execution in a determined way. Examples of further modifications that may be performed include 1) forced conditional modifications in which the abstract syntax tree is modified such that a condition on a condition statement is forced to true, 2) loop guards that force a halting of at least one loop should that loop statement take too long to executed, and 3) a forced exit of a recursion in which the abstract syntax tree is modified to force an exit from a recursion faster than would otherwise occur without the modification.

In a particular embodiment, one or more of the directed execution transformations may be left disabled. In that case, the transformation may be later enabled without again performing an analysis of the application context to thereby later modify the abstract syntax tree. Instead, the transformation is enabled if needed. This may be particularly advantageous as it may not be necessary to ever enable the directed execution transformation. Modifying the course of execution through directed execution transformations may perhaps change the application state at the identified specific location, and thereby perhaps degrade the accuracy of the resultant available symbol set generated by analyzing that application state. Accordingly, by inserting disabled directed execution transformations before execution, the transformations may be made perhaps more efficiently, while leaving open the possibility that the directed execution will not have to be performed.

In one specific embodiment, only loop guard transformations are made at this point, and those loop guard transformations are left disabled. A loop guard forces a halting of at least one loop statement should that loop statement take a long time to execute. This helps in cases in which the halt point resides within a code portion whose execution is delayed by the loop statement. The term "loop statement" is meant to refer to any statement, regardless of language, which causes a code segment to be executed multiple times. Suppose, for example, that the abstract syntax tree originally represented the following source code:

while (a)
work( )

In other words, as long as condition a is met, then the function work will be repeatedly executed. This might prevent the halt point from ever being reached, or being reached in a timely manner. The abstract syntax tree may be modified to restrict the loop statement to a particular number of iterations.

while (a &&_lg1++<1000)
work( )

This may be referred to as a "loop guard" (represented as lg1 in the example) since the modification limits the number of times that the while loop repeats.

Other than syntactical corrections, or directed execution, there may be other reasons to modify the abstract syntax tree even prior to execution. For instance, the abstract syntax tree of the dynamic language program may be altered such that authoring-time metadata is attached to a variable. Such authoring-time metadata might be useful specifically for the author in the context of the dynamic language program being authored.

For instance, the metadata might describe where the type of a variable was declared. However, a tracking value is generated earlier. If the variable is accessed but does not contain a value that would generate a useful completion list (that is, it is null or undefined), and there is a metadata comment as described above, then a tracking value is created instead. It is treated during execution as the original value (either null or undefined) but is recognized by the completion list generating code as a containing a value that should be used instead of the null or undefined. In this case, the abstract syntax tree could be modified to attach a value that is set once the variable definition is encountered during execution.

Once appropriate modification, if any, has occurred, the current dynamic program is executed (act 604). Referring to FIG. 5, execution of the current dynamic program is represented by action 550 in which case the byte code 540 is interpreted, or action 570 in which the machine code is directly executed by the environment 500 outside of the language service provider 501.

If, during execution (act 604), a halt point is reached ("Yes" in decision block 605), then the state of the current dynamic program may be analyzed as it exists at the halt point (act 606). In some cases, an available symbol set might not be able to be generated based on such analysis ("No" in decision block 607), in which case no available symbol set is generated (act 608). However, in some cases, and it is hoped most cases, an available symbol set can be generated based on such analysis ("Yes" in decision block 607), in which case the available symbol set is generated (act 609). In some embodiments, the language service provider may use the application context of the dynamic language program in order to generate the available symbol set.

If, during execution (act 604), a halt point is not yet reached ("No" in decision block 605), and the time to execute has not yet expired ("No" in decision block 610), then execution continues (act 604). If, during execution (act 604), a halt point has not been reached ("No" in decision block 605), and the time to execute has expired ("Yes" in decision block 610), then this indicates that execution may be taking too long to reach the halt point. The management component 230 may have explicit control over the control of this expiration timing. It may be a fixed amount of time that is already determined at the time that execution begins, or it may be a time that is adjusted as execution proceeds. The expiration time might be user configurable. The language service provider itself may perhaps have another expiration time, but this expiration time is not relied upon by the management component 230 in some embodiments.

Accordingly, at this point ("No" in decision block 605, and "Yes" in decision block 610), if there are pre-execution transformations that are not enabled ("Yes" in decision block 611), then the pre-execution transformations are enabled and the execution time is reset (act 612). For instance, in the case where the loop guards transformations were performed prior to execution (act 603), but were left disabled, those loop guard transformations may now be enabled (act 612). Execution may then be reattempted (act 604) with the aim to reach the halt point ("Yes" in decision block 605) before execution time expires ("Yes" in decision block 610).

If, however, time expires again ("Yes" in decision block 610), and if there are no further opportunities to enabled more disabled pre-execution transformations ("No" in decision block 611), it is determined whether there are any deferred transformations that are to be applied to the abstract syntax tree (decision block 613). If there are no such deferred transformations ("No" in decision block 613), then the available symbol set is not generated (act 608). If there are such deferred transformations ("Yes" in decision block 613), then the abstract syntax tree is modified at that time, and the execution time is reset (act 614). For example, any of the example directed execution transformations enumerated above (such as forced conditionals, loop guards, forced recursion exit, or others) may be performed at act 614 instead of or in addition to being performed pre-execution at act 603. In one example, the loop guard transformations are added pre-execution, but disabled, and forced conditionals are deferred to act 614. This process continues until either no available symbol set is generated (act 608) or until an available symbol set is generated (act 609) (which it is hoped would be more common). Then execution is reattempted at act 604.

Accordingly, the principles described herein provide a framework in which the use of language service providers to provide available symbol sets for dynamic language programs is carefully monitored and managed to improve performance in providing available symbol sets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage device having thereon computer-executable instructions that are structured such that, when executed by one or more processors of a computing system, causes the computing system to instantiate and operate a language service provider framework that comprises:

an application context generation component configured to generate an application context of a dynamic language program being authored, the application context including one or more specific locations in the dynamic language program, a description of the dynamic language program, and runtime environment information corresponding to operation of the dynamic language program;

a language service provider port component configured to hold one or more language service providers; and a management component configured to 1) receive the application context from the application context generation component, 2) provide the application context to a language service provider held by the language service provider port component, and 3) receive a set of available symbols corresponding to each of at least one of the one or more specific locations from the language service provider.

2. The computer program product in accordance with claim 1, wherein when the language service provider port component holds a plurality of language service providers, the management component is further configured to select one of the plurality of language service providers to provide the set of available symbols.

3. The computer program product in accordance with claim 2, wherein the management component is configured to select the language service provider based at least in part on a user preference.

4. The computer program product in accordance with claim 2, wherein the management component is configured to select the language service provider based at least in part on a default selection.

5. The computer program product in accordance with claim 2, wherein the management component is further configured to evaluate a historical performance of each of the plurality of language service providers, and is configured to select the language service provider based at least in part on the historical performance of each of the plurality of language service providers.

6. The computer program product in accordance with claim 2, wherein the management component is further configured to disable a language service provider of the plurality of language service providers if a performance of the language service provider crashes or otherwise has poor performance.

7. The computer program product in accordance with claim 2, wherein the management component is further configured to select a fall-back ordering of the plurality of language service providers in case of a failure of one or more of the plurality of language service providers to provide acceptable available symbol set.

8. The computer program product in accordance with claim 2, wherein the management component is further configured to register new language service components as they are added to the language service provider port component.

9. The computer program product in accordance with claim 1, wherein the management component is further configured to search for available language service providers that could be plugged into the language service provider port component.

10. The computer program product in accordance with claim 1, wherein the management component is further configured to cause the dynamic language program to be rewritten in cases in which the available symbol set fails to be returned or in cases in which the available symbol set is delayed.

11. The computer program product in accordance with claim 1, wherein the runtime environment information of the application context includes an identification of environmental software in which the dynamic language program may be run.

12. The computer program product in accordance with claim 11, wherein the environmental software includes a set of possible environmental software in which the dynamic language program may be run, wherein the language service provider interprets the set of possible environmental software to determine a set of available APIs to provide to the dynamic language program, the set of available APIs being common to all of the possible environmental software.

13. The computer program product in accordance with claim 1, wherein the management component directs a download operation in which external components may be accessed in order to formulate the application context.

14. The computer program product in accordance with claim 1, wherein the application context includes dependency information regarding execution resources the dynamic language program depends on.

15. The computer program product in accordance with claim 14, wherein the dependency information includes at least a portion of the application context that is external to the dynamic language program itself.

16. The computer program product in accordance with claim 1, wherein the management component is configured to capture environmental state upon completion of execution of dynamic language programs.

17. A computing system comprising:
at least one processor; and
a language service provider framework that is configured for implementing a method for managing generation of available symbols corresponding to one or more specific locations of a dynamic language program during the authoring of the dynamic language program, the language service provider framework including:
an application context generation component which generates an application context of the dynamic language program being authored, the application context including at least one or more specific locations in the dynamic language program, a description of the dynamic language program, and runtime environment information corresponding to operation of the dynamic language program;
a language service provider port component configured to hold one or more language service providers; and
a management component configured to 1) receive the application context from the application context generation component, 2) provide the application context to a language service provider held by the language service provider port component, and 3) receive a set of available symbols corresponding to each of at least one of the one or more specific locations from the language service provider.

18. The computing system in accordance with claim 17, wherein when there is a plurality of language service providers available to the computing system, the computing system selects one of the plurality of language service providers to provide the set of available symbols based on one or more of the following:
a user preference; and
a historical performance of each of the plurality of language service providers.

19. The computing system in accordance with claim 17, wherein the computing system causes the dynamic language program to be rewritten for authoring purposes in cases in which the set of available symbols fails to be returned.

20. A computer program product comprising one or more computer-readable hardware storage device having thereon computer-executable instructions that are structured such that, when executed by one or more processors of a computing system, causes the computing system to instantiate and operate a language service provider framework that comprises:
an application context generation component configured to generate an application context of a dynamic language program being authored, the application context including one or more specific locations in the dynamic language program, a description of the dynamic language program, and runtime environment information corresponding to operation of the dynamic language program;
a language service provider port component configured to hold a plurality language service providers; and
a management component configured to 1) receive the application context from the application context generation component, 2) select one of the plurality of language service providers to use, 3) provide the application context to the selected language service provider, 4) receive a set of available symbols corresponding to each of at least one of the one or more specific locations from the selected language service provider, and 5) cause the dynamic language program to be written exclusively for authoring purpose and resubmitted to the selected language service provider if the selected language service provider does not timely provide the set of available symbols.

* * * * *